(12) United States Patent
Gatson et al.

(10) Patent No.: US 11,232,366 B2
(45) Date of Patent: Jan. 25, 2022

(54) SYSTEM AND METHOD FOR MANAGING INFORMATION HANDLING SYSTEMS

(71) Applicant: DELL PRODUCTS L.P., Round Rock, TX (US)

(72) Inventors: Michael S. Gatson, Austin, TX (US); Vivek Viswanathan Iyer, Austin, TX (US); Karthikeyan Krishnakumar, Austin, TX (US); Michiel S. Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 16/725,240

(22) Filed: Dec. 23, 2019

(65) Prior Publication Data

US 2021/0191792 A1    Jun. 24, 2021

(51) Int. Cl.
| | |
|---|---|
| *G06N 5/04* | (2006.01) |
| *G06N 20/00* | (2019.01) |
| *G06K 9/00* | (2006.01) |
| *G10L 25/51* | (2013.01) |
| *G06F 3/0481* | (2013.01) |
| *G06T 3/60* | (2006.01) |
| *G06F 3/14* | (2006.01) |
| *G06F 3/02* | (2006.01) |
| *G06F 17/00* | (2019.01) |

(52) U.S. Cl.
CPC .............. *G06N 5/04* (2013.01); *G06F 3/0481* (2013.01); *G06K 9/00597* (2013.01); *G06N 20/00* (2019.01); *G10L 25/51* (2013.01); *G06F 3/0227* (2013.01); *G06F 3/1446* (2013.01); *G06T 3/60* (2013.01)

(58) Field of Classification Search
CPC ........ G06N 5/04; G06N 20/00; G06F 3/0481; G06F 3/1446; G06F 3/0227; G10L 25/51; G06K 9/00597; G06T 3/60
See application file for complete search history.

(56) References Cited

U.S. PATENT DOCUMENTS

| | | | |
|---|---|---|---|
| 10,970,895 B1* | 4/2021 | Knas | G06F 3/0481 |
| 2012/0272179 A1* | 10/2012 | Stafford | G06F 3/038 |
| | | | 715/781 |
| 2015/0116364 A1* | 4/2015 | Aurongzeb | G06F 1/3265 |
| | | | 345/659 |
| 2016/0313805 A1* | 10/2016 | Vroom | G06F 3/013 |
| 2021/0118410 A1* | 4/2021 | Grieves | G06F 3/04842 |

* cited by examiner

*Primary Examiner* — Quoc A Tran
(74) *Attorney, Agent, or Firm* — Baker Botts L.L.P.

(57) ABSTRACT

Systems and methods are disclosed for managing information handling systems that may include receiving, by a focus management system, a signal from each information handling system indicating a focus mode of a user, each information handling system including a focus engine configured to determine the focus mode of the user based on contextual input, the focus mode indicating whether the user is in a focused state or in a distracted state; determining that a user of a given information handling system is in the distracted state; and in response to determining that the user of the given information handling system is in the distracted state: identifying a priority status associated with the given information handling system; and causing a focus management event to occur based on the identified priority status, the focus management event causing each user of the information handling systems to be in the focused state.

20 Claims, 3 Drawing Sheets

SYSTEM AND METHOD FOR MANAGING INFORMATION HANDLING SYSTEMS

BACKGROUND

Field of the Disclosure

The disclosure relates generally to information handling systems, and in particular to a system and method for managing information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing information handling systems may include: receiving, by a focus management system, a signal from each of the plurality of information handling systems indicating a focus mode of a user, each of the plurality of information handling systems including a focus engine configured to determine the focus mode of the user based on contextual input, the focus mode indicating whether the user is in a focused state or in a distracted state; determining, by the focus management system based on the focus mode, that a user of a given information handling system of the plurality of information handling systems is in the distracted state; and in response to determining that the user of the given information handling system is in the distracted state: identifying a priority status associated with the given information handling system; and causing a focus management event to occur based on the identified priority status, the focus management event causing each user of the plurality of information handling systems to be in the focused state.

In one or more of the disclosed embodiments, causing the focus management event to occur comprises: determining, by the focus management system, that the priority status associated with the given information handling system is above a threshold priority status; and in response to determining that the priority status is above the threshold priority status: transmitting a signal to each of the plurality of information handling systems indicating that the user of the given information handling system is in the distracted state.

In one or more of the disclosed embodiments, causing the focus management event to occur comprises: determining, by the focus management system, that the priority status associated with the given information handling system is below a threshold priority status; and in response to determining that the priority status is below the threshold priority status: refraining from transmitting a signal to each of the plurality of information handling systems indicating that the user of the given information handling system is in the distracted state.

In one or more of the disclosed embodiments, causing the focus management event to occur comprises: causing, by the focus management system, an audio sensor of the given information handling system to be in a muted state, the muted state of the audio sensor preventing each user of the plurality of information handling systems from hearing the user of the given information handling system.

In one or more of the disclosed embodiments, identifying the priority status associated with the given information handling system is based on a machine learned model.

In one or more of the disclosed embodiments, determining the focus mode of the user based on contextual input comprises: accessing, by the focus engine of each of the plurality of information handling systems, one or more images of the user captured by an image sensor of the information handling system; determining, by the focus engine, that a gaze of the user is not directed toward the information handling system; and causing, by the focus engine, the focus mode of the user to indicate that the user is in the distracted state.

In one or more of the disclosed embodiments, the method further comprises determining, by the focus engine, that the gaze of the user is directed toward the information handling system; and causing, by the focus engine, the focus mode of the user to indicate that the user is in the focused state.

In one or more of the disclosed embodiments, determining the focus mode of the user based on contextual input comprises: accessing, by the focus engine of each of the plurality of information handling systems, an audio stream captured by an audio sensor of the information handling system; determining, by the focus engine, that the audio stream includes an ambient noise causing the user to be in the distracted state; and causing, by the focus engine, the focus mode of the user to indicate that the user is in the distracted state.

In one or more of the disclosed embodiments, the method further comprises determining, by the focus engine, that the audio stream does not include the ambient noise causing the user to be in the distracted state; and causing, by the focus engine, the focus mode of the user to indicate that the user is in the focused state.

In one or more of the disclosed embodiments, determining the focus mode of the user based on contextual input comprises: accessing, by the focus engine of each of the plurality of information handling systems, a proximity signal captured by a proximity sensor of the information handling system; determining, by the focus engine, whether the user is within a threshold proximity to the information handling system based on the proximity signal; and in response to determining that the user is not within the threshold proximity to the information handling system, causing, by the focus engine, the focus mode of the user to indicate that the user is in the distracted state.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
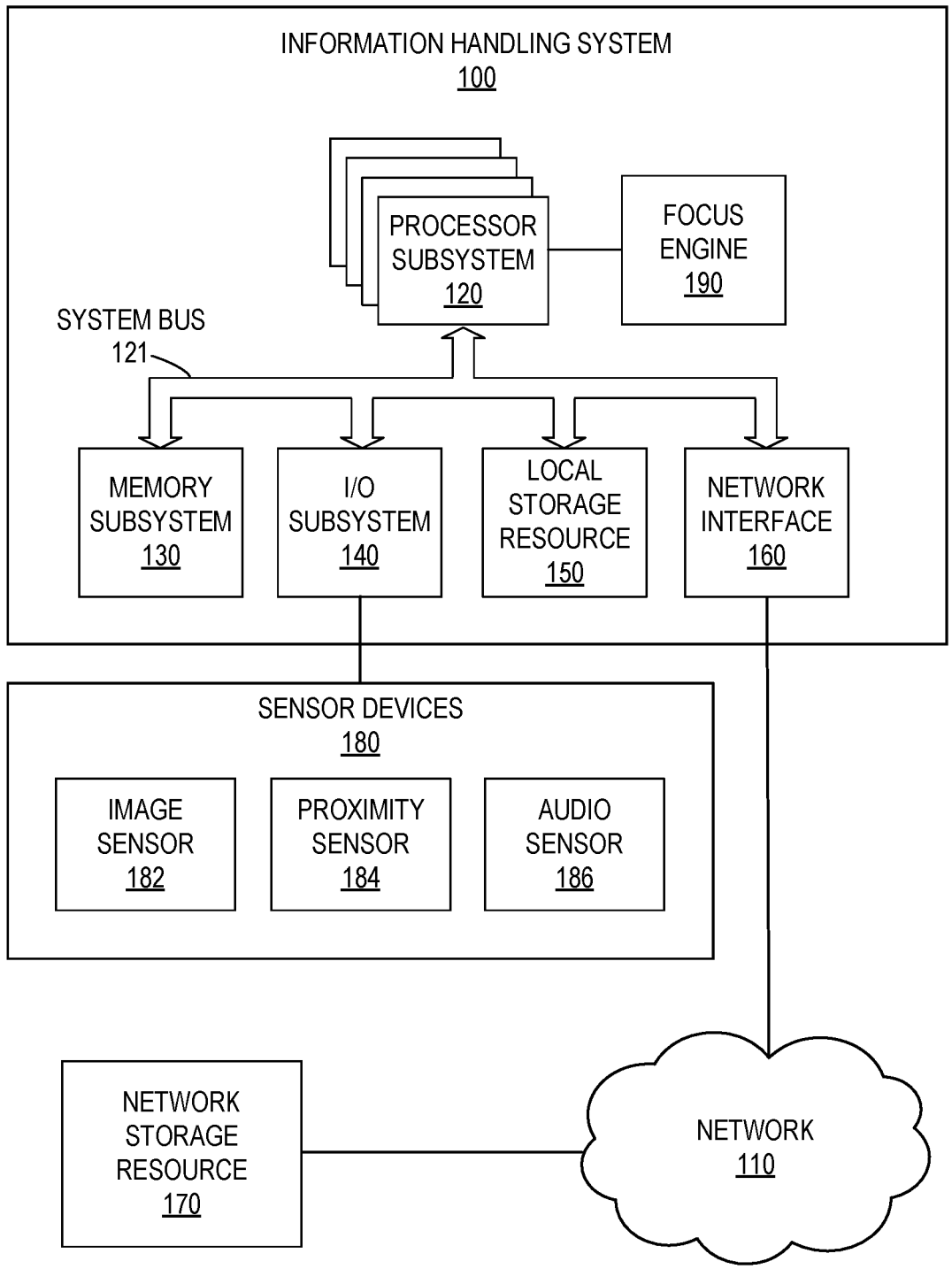
FIG. 1 is a block diagram of selected elements of an embodiment of an information handling system that includes a focus engine and sensors.

This document describes a method for managing information handling systems that may include: receiving, by a focus management system, a signal from each of the plurality of information handling systems indicating a focus mode of a user, each of the plurality of information handling systems including a focus engine configured to determine the focus mode of the user based on contextual input, the focus mode indicating whether the user is in a focused state or in a distracted state; determining, by the focus management system based on the focus mode, that a user of a given information handling system of the plurality of information handling systems is in the distracted state; and in response to determining that the user of the given information handling system is in the distracted state: identifying a priority status associated with the given information handling system; and causing a focus management event to occur based on the identified priority status, the focus management event causing each user of the plurality of information handling systems to be in the focused state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
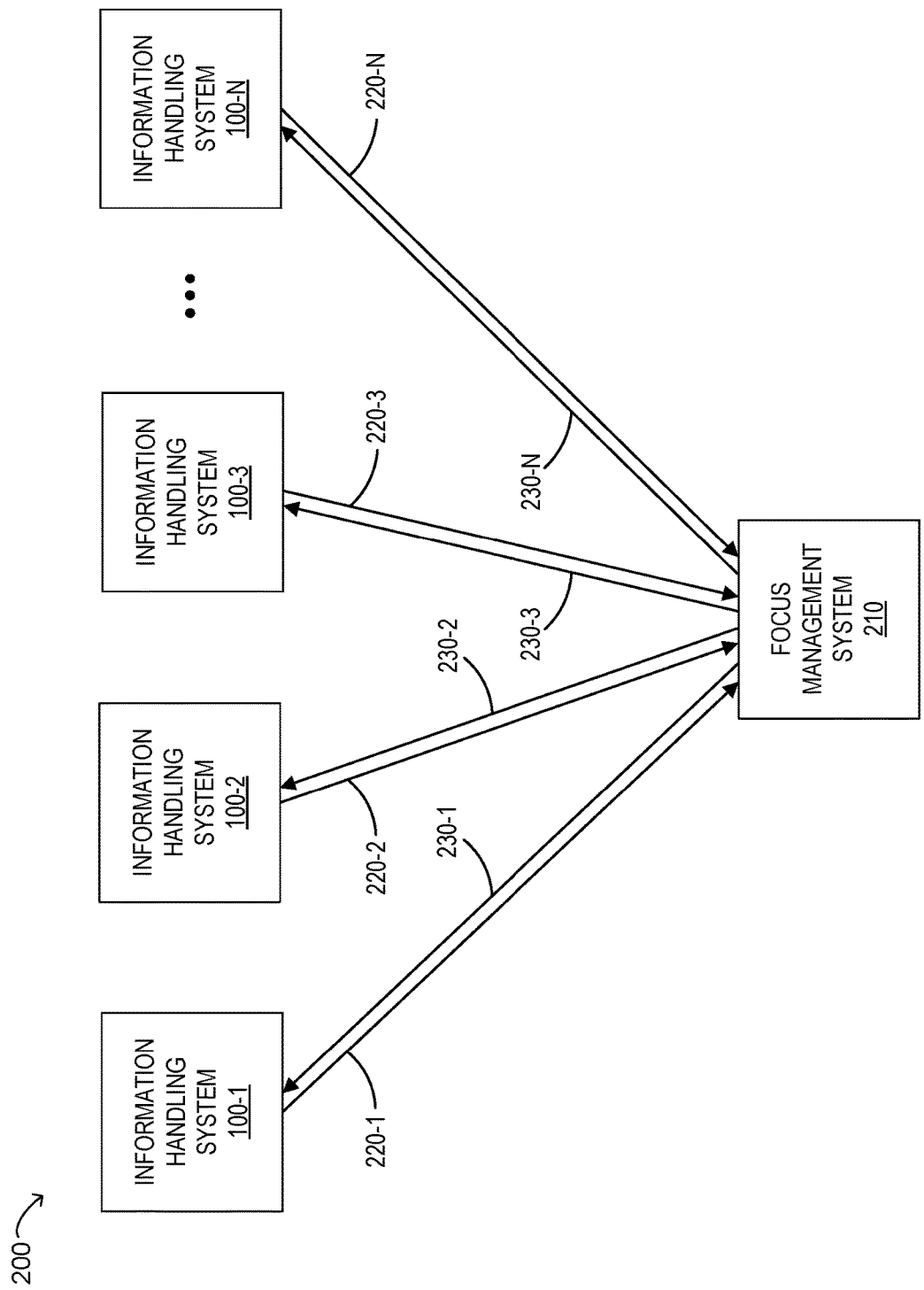
FIG. 2 is a block diagram of selected elements of an embodiment of a computing system for managing information handling systems based on focus mode.
Figure 3:
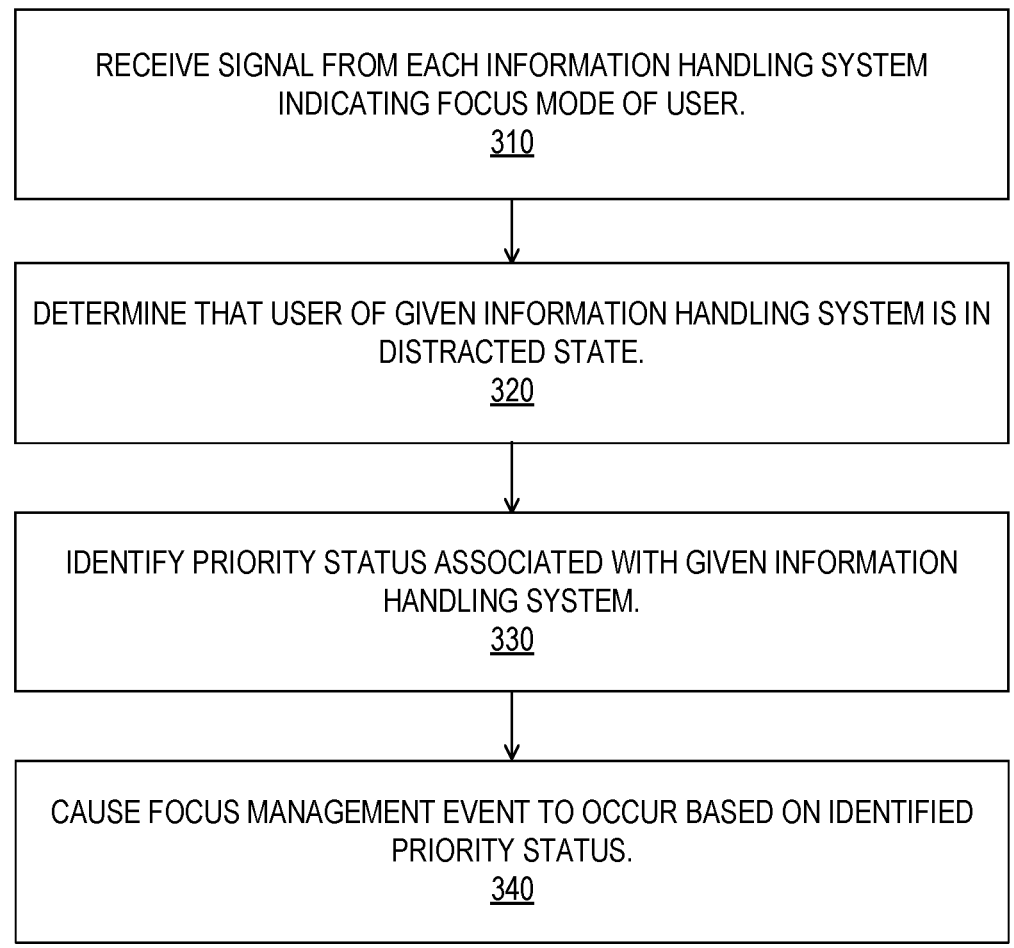
FIG. 3 is a flowchart depicting selected elements of an embodiment of a method for managing information handling systems.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to sensor devices 180, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In one embodiment, sensor devices 180 may capture image and/or audio data, or "contextual input," from a user of information handling system 100. The contextual input captured by sensor devices 180 may be used to determine a level of attentiveness, or a "focus mode," of a user. Specifically, sensor devices 180 may provide contextual input to focus engine 190 such that focus engine 190 may determine if the user is focused on an immediate task, or in a "focused state," or if the user is distracted from the immediate task, or in a "distracted state." In the embodiment illustrated in FIG. 1, sensor devices 180 may include an image sensor 182, a proximity sensor 184, and an audio sensor 186. In other embodiments, sensor devices 180 may include additional, fewer, and/or any combination of sensor devices suitable for capturing contextual input from a user to determine a focus mode.

In one embodiment, image sensor 182 may comprise a system, device, or apparatus generally operable to capture one or more images of a user of information handling system 100. In particular, image sensor 182 may capture one or more images of an environment (e.g., office, workspace, cubicle, and the like) of the user. These one or more images may be used for contextual input to determine, for example, if the user is currently seated in front of information handling system 100 working or away from information handling system 100 performing other tasks. In one embodiment, image sensor 182 may include facial recognition and/or eye-tracking capabilities such that image sensor 182 can determine if a gaze of the user is directed toward or away from information handling system 100. For example, if a user is focused on drafting a patent application and is seated in front of information handling system 100, image sensor 182 may capture images of the user seated in front of information handling system 100. Additionally, image sensor 182 may capture images of the gaze of the user directed toward a display of information handling system 100. These images captured by image sensor 182 may be used by focus engine 190, in part, to determine a focus mode of the user. In one embodiment, image sensor 182 may be equipped with a standard complementary metal oxide semiconductor (CMOS) sensor through which color images of a user and/or user environment are acquired, for example, such as that of an RGB camera. In other embodiments, image sensor 182 may be or include a thermographic camera, infrared camera, and/or any combination of image sensors suitable for capturing one or more images of the user.

In one embodiment, proximity sensor 184 may comprise a system, device, or apparatus generally operable to identify if a user of information handling system 100 is close, or within a "threshold proximity," to information handling system 100. Specifically, proximity sensor 184 may emit a signal, or a "proximity signal," throughout an environment of the user to detect where the user is physically located within the environment. The proximity signal may be used as contextual input to determine if the user is within a threshold proximity to information handling system 100. For example, is a user is seated in front of information handling system 100, a proximity signal emitted from proximity sensor 184 may indicate that the user is within the threshold proximity to information handling system 100. In contrast, if the user leaves the area surrounding information handling system 100 to perform other tasks, the proximity signal may indicate that the user is no longer within the threshold proximity to information handling system 100. The proximity signal emitted by proximity sensor 184 may be used by focus engine 190, in part, to determine a focus mode of the user. In one embodiment, proximity sensor 184 may be or include a Light Detection and Ranging (LIDAR) sensor. In other embodiments, proximity sensor 184 may be or include a Time of Flight (ToF) three-dimensional (3D) depth sensor, an ultrasonic sensor, and/or any combination of proximity sensors suitable for identifying if a user is within a threshold proximity to information handling system 100.

In one embodiment, audio sensor 186 may comprise a system, device, or apparatus generally operable to capture audio, or an "audio stream," of a user of information handling system 100. The audio stream captured by audio sensor 186 may be used as contextual input to determine a focus mode of the user. For example, if a user is seated in front of information handling system 100, audio sensor 186 may capture an audio stream of the user working, such as sounds of the user typing on a keyboard and/or participating in a conference call via audio sensor 186. If the user leaves the area surrounding information handling system 100, the audio stream captured by audio sensor 186 may include ambient sounds of the environment of the user and/or the sounds of an empty room. In one embodiment, the audio stream captured by audio sensor 186 may be used, in part, by focus engine 190 to determine a focus mode of the user. In another embodiment, the audio stream captured by audio sensor 186 may additionally be used, in part, by focus engine 190 to determine a connection quality (e.g., quality of bandwidth, audio/video resolution, bitrate, and the like) associated with information handling system 100. For example, focus engine 190 may access an audio stream captured by audio sensor 186 to determine if the connection quality of information handling system 100 is experiencing bandwidth and/or packet loss issues during a conference meeting. Here, connection quality may affect the focus mode of the user, and/or other users, if the user becomes distracted due to poor connection quality. In one embodiment, audio sensor 186 may be or include a dynamic microphone communicatively coupled to information handling system 100. In other embodiments, audio sensor 186 may be or include a microelectromechanical systems (MEMS) microphone, a dynamic universal serial bus (USB) microphone, and/or any combination of audio sensors suitable for capturing an audio stream of a user.

In information handling system 100, focus engine 190 may comprise a system, device, or apparatus generally operable to determine a focus mode of a user of information handling system 100. In particular, focus engine 190 may determine whether or a user is in a focused state or in a distracted state based on contextual input captured by sensor devices 180. The focused state of the user may indicate that the user is currently focused on an immediate task such that the user's attention is not distracted by peripheral notifications or interferences. For example, a user may be in a focused state while drafting a document, presenting in a conference meeting, and/or completing various administrative duties. In contrast, the distracted state of the user may indicate that the user is currently distracted from focusing on an immediate task. For example, a user may be in a distracted state while having a personal conversation with a coworker, receiving a notification from a social media network, and/or answering a person email. Focus engine 190 may use these contextual inputs captured by sensor devices 180, alone or in combination, to determine the focus mode of the user.

In one embodiment, focus engine 190 may access one or more images captured by image sensor 182 to determine a focus mode of the user. In particular, focus engine 190 may use the one or more images captured by image sensor 182 as contextual input to determine whether the user is in the focused state or in the distracted state. In one embodiment, if the one or more images captured by image sensor 182 show the user to be seated in front of information handling system 100 wearing a headset, focus engine 190 may determine that the user is in the focused state while participating in a teleconference meeting. However, if the one or more images captured by image sensor 182 show the user to be away from the workspace, or the area surrounding information handling system 100, focus engine 190 may determine that the user is in the distracted state while not focused on an immediate task. In another embodiment, if the one or more images captured by image sensor 182 show consistent hand movement of the user, focus engine 190 may determine that the user is in the focus state while typing, for example, a document or email. In contrast, if the one or more images captured by image sensor 182 show the hand movements of the user to be random and/or irregular, focus engine may determine that the user is in the distracted state, for example, while in conversation with a boss or coworker. In one embodiment, focus engine 190 may utilize facial recognition and/or eye-tracking capabilities of image sensor 182 as contextual input to determine a focus mode of a user. For instance, if the one or more images captured by image sensor 182 show the user to be seated in front of information handling system 100, focus engine 190 may additionally determine if a gaze of the user is directed toward or away from information handling system 100. If the gaze of the user is directed toward information handling system 100, focus engine 190 may determine that the user is in the focused state. Specifically, if the gaze of the user is directed toward information handling system 100 (e.g., toward a display of information handling system 100) and the gaze of the user does not stray beyond a threshold margin, focus engine 190 may determine that the user is in the focused state. In contrast, if the gaze of the user is directed away from information handling system 100 (e.g., while addressing a nearby coworker, talking on the phone, and the like) above a threshold period of time (e.g., 10 seconds), focus engine 190 may determine that the user is in the distracted state.

In one embodiment, focus engine 190 may determine a collective focus mode for a user and one or more additional users. For example, if a gaze of the user is directed toward information handling system 100 and one or more additional users approach information handling system 100 to join the user in a conference meeting, focus engine 190 may determine if a collective gaze of the user and the one or more additional users is directed toward or away from information handling system 100. If the collective gaze is directed toward information handling system 100 and the collective gaze does not stray beyond a collective threshold margin, focus engine 190 may determine that the user and the one or more additional users are in the focused state. Conversely, if the collective gaze of the user or any of the one or more additional users is directed away from information handling system 100 above a threshold period of time, focus engine 190 may determine that the user and the one or more additional users are in the distracted state.

In one embodiment, focus engine 190 may access an audio stream captured by audio sensor 186 to determine a focus mode of the user. Specifically, focus engine 190 may use the audio stream captured by audio sensor 186 as contextual input to determine whether the user is in the focused state or in the distracted state. For example, if a user is seated in front of information handling system 100, audio sensor 186 may capture an audio stream of the user working, such as sounds of the user typing on a keyboard and/or participating in a conference call via audio sensor 186. Upon identifying that the user is working, focus engine 190 may determine that the user is in the focused state. In contrast, if the user leaves the area surrounding information handling system 100, the audio stream captured by audio sensor 186 may include ambient sounds of the environment of the user and/or the sounds of an empty room. Upon determining that the user is not within the area surrounding information handling system 100, focus engine 190 may determine that the user is in the distracted state. In one embodiment, focus engine 190 may use the contextual input captured by audio sensor 186 in conjunction with contextual input captured by other sensor devices 180 of information handling system 100. For example, upon identifying that the audio stream captured by audio sensor 186 includes the sounds of an empty room, focus engine 190 may additionally use one or more images captured by image sensor 182 as contextual input to confirm that the room is in fact empty.

In one embodiment, focus engine 190 may access a proximity signal captured by proximity sensor 184 to determine a focus mode of the user. In particular, focus engine 190 may use the proximity signal as contextual input to determine whether the user is in the focused state of in the distracted state. For example, if the proximity signal captured by proximity sensor 184 indicates that a user is within a threshold proximity to information handling system 100, focus engine 190 may determine that the user is working on an immediate task and is in the focused state. In contrast, if the proximity signal captured by proximity sensor 184 indicates that the user is not within the threshold proximity to information handling system 100, focus engine 190 may determine that the user is not working on an immediate task and is in the distracted state. In one embodiment, focus engine 190 may use the contextual input captured by proximity sensor 184 in conjunction with contextual input captured by other sensor devices 180 of information handling system 100. For example, upon identifying that the proximity signal captured by proximity sensor 184 indicates that the user is within the threshold proximity to information handling system 100, focus engine may additionally use one or more images captured by image sensor 182 as contextual input to confirm that the user is seated in front of information handling system and that the gaze of the user is directed toward information handling system 100.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

FIG. 2 is a block diagram of selected elements of an embodiment of a computing system for managing information handling systems based on focus mode. In the embodiment illustrated in FIG. 2, computing system 200 includes information handling systems 100-1 through 100-N (collectively referred to herein as "information handling systems 100") and a focus management system 210. Each information handling system 100-1 through 100-N illustrated in FIG. 2 may be similar to information handling system 100 described with respect to FIG. 1 and may be communicatively coupled to focus management system 210 (e.g., via network 110). Focus management system 210 may be similar to information handling system 100 described with respect to FIG. 1. In one embodiment, each of information handling systems 100, or a subset thereof, may include a focus management system 210. In other embodiments, computing system 200 may include additional, fewer, and/or any combination of components suitable for managing information handling systems based on focus mode.

In the embodiment illustrated in FIG. 2, focus management system 210 may comprise a system, device, or apparatus generally operable to manage one or more information handling systems 100 based, in part, on a focus mode of each information handling system 100-1 through 100-N. In one embodiment, focus management system 210 may be used to manage information handling systems 100 in a conference meeting environment (e.g., a teleconference meeting, video conference meeting, and the like), or other environment involving a unified collaboration, in which each information handling system 100-1 through 100-N, or a subset thereof, is a participant. Here, the focus engine 190 of each information handling system 100-1 through 100-N may determine a focus mode of its user during the conference meeting based on contextual input received from sensor devices 180 as described with respect to FIG. 1. Each information handling system participating in the conference meeting may transmit a signal indicating the focus mode of its user to focus management system 210. This is illustrated in FIG. 2 where each information handling system 100-1 through 100-N transmits a respective signal 220-1 through 220-N (collectively referred to herein as "signals 220"). Focus management system 210 can receive the respective signals 220 from each information handling system 100-1 through 100-N indicating a focus mode and can cause one or more events, or "focus management events," to occur based, in part, on the received focus mode. This is illustrated in FIG. 2 where focus management system 210 transmits respective signal 230-1 through 230-N (collectively referred to herein as "signals 230") that may cause respective focus management events to occur based, in part, on signals 220. Each focus management event caused by focus management system 210 may be oriented toward minimizing distractions for each user of an information handling system participating in the conference meeting. In one embodiment, focus management system 210 may be or include a coordinator of a conference meeting. In other embodiments, focus management system 210 may be or include an information handling system similar to information handling systems 100-1 through 100-N, an administrator of computing system 200, and/or any combination of systems suitable for managing one or more information handling systems based on focus mode.

In one embodiment, a focus management event caused by focus management system 210 may include remotely accessing and controlling audio settings of a given information handling system having a user in the distracted state. In particular, focus management system 210 may increase and/or decrease a volume level of an audio stream associated with the given information handling system having the user in the distracted state, cause an audio sensor 186 of the given information handling system to be in a muted state, and/or cause a headset and/or speaker of the given information handling system to be in a muted state. In addition, focus management system 210 may transmit a signal to each information handling system having a user in the focused state. The transmitted signal may indicate that the user of the given information handling system is in the distracted state. Such focus management events caused by focus management system 210 ensure that each user in the focused state during a conference meeting may remain in the focused state throughout the conference meeting without becoming distracted by a user in the distracted state.

In one embodiment, focus management system 210 may control a volume level of conference meeting audio streaming on a given information handling system if the user becomes distracted during a conference meeting. Specifically, focus management system 210 may control the volume level of the conference meeting audio stream if a colleague, or "secondary user," enters the workspace (e.g., office, cubicle, and the like) of the user causing the user to be in the distracted state. In one embodiment, focus management system 210 may increase and/or decrease the volume level of the conference meeting audio stream (e.g., streamed via a headset and/or speakers) based on a proximity of the secondary user to the user. That is, a decibel level of the conference meeting audio stream playing in a headset of the user may correlate to a distance of the secondary user relative to the user. For example, if the secondary user advances three feet toward the user, focus management system 210 may decrease the conference meeting audio stream by three decibels. This mapping between distance of the secondary user in relation to the user and decibel level may similarly be applied as the secondary user leaves the workspace of the user until the volume level of the conference meeting audio stream is returned to the original volume level (i.e., before the secondary user entered the workspace). By allowing the user in the distracted state to participate in the conversation with the secondary user without removing a headset and/or manually adjusting audio settings, focus management system 210 may help to ensure that the user can quickly return to the focused state from the distracted state when the conversation with the secondary user has ended.

In one embodiment, a focus management event caused by focus management system 210 may include muting one or more components of an information handling system having a user in the distracted state. In one embodiment, focus management system 210 may mute an audio sensor 186 of an information handling system having a user in the distracted state. For example, the image sensor 182 of information handling system 100-1 shown in FIG. 2 may capture one or more images of a user removing a headset, and/or becoming distracted by a secondary user outside of the field of view of the image sensor 182, during a conference meeting in which the user is a participant. Here, although the secondary user may be outside of the field of view, image sensor 182 may capture one or more images of the user's lip movement and/or redirected gaze while the user addresses the secondary user. Image sensor 182 may provide the one or more images to focus engine 190 of information handling system 100-1 as contextual input. Based on the contextual input, focus engine 190 may determine that the focus mode of the user is in the distracted state and provide the focus mode of the user to focus management system 210 via signal 220-1. Upon determining that the user is in the distracted state, focus management system 210 may cause audio sensor 186 of information handling system 100-1 to be in a muted state (e.g., via signal 230-1) to prevent other users participating in the conference meeting from hearing the user of information handling system 100-1 while the user is in the distracted state. This may help to ensure that the other users participating in the conference meeting are not distracted by the user and may remain in the focused state. In another embodiment, focus management system 210 may mute a headset and/or speaker of an information handling system having a user in the distracted state. For example, if a secondary user approaches the user of information handling system 100-1, image sensor 182 may capture one or more images of the secondary user as contextual input. Focus engine 190 of information handling system 100-1 may determine that the user is in the distracted state and provide the focus mode of the user to focus management system 210 via signal 220-1. Upon determining that the user of information handling system 100-1 is in the distracted state, focus management system 210 may cause a headset and/or speaker of information handling system 100-1 to be in a muted state (e.g., via signal 230-1) such that the user of information handling system 100-1 may participate in the conversation with the secondary user without removing a headset and/or manually adjusting audio settings as described above. In one embodiment, focus management system 210 may additionally cause streaming media (e.g., music streaming on a multi-media player) to pause while the user is participating in the conversation with the secondary user. When the conversation between the user and the secondary user has ended and the user returns to the focused state, each of the one or more muted, or paused, components may resume their respective states prior to the user becoming distracted.

In one embodiment, each information handling system 100-1 through 100-N may be associated with a priority status. The priority status associated with each information handling system may indicate to focus management system 210 a priority in which the information handling system is to participate in the conference meeting in relation to a margin of participation required to effectively conduct the conference meeting, or a "threshold priority status." That is, the priority status associated with a given information handling system may indicate a priority in which the user of the given information handling system is to remain in the focused state during the conference meeting in relation to the threshold priority status. In one embodiment, the priority status associated with a given information handling system may be based on performance criteria associated with the conference meeting (e.g., whether a user is scheduled to lead a presentation, is expected to be a primary participant, and/or is directly related to the subject matter to be discussed during the conference meeting). Focus management system 210 may identify the priority status associated with each information handling system participating in the conference meeting and determine whether the identified priority status is above or below the threshold priority status. For example, if a user of information handling system 100-1 shown in FIG. 2 is scheduled to lead a presentation during a conference meeting in which information handling systems 100-2 and 100-3 are participants, focus management system 210 may associate information handling system 100-1 with a priority status above the threshold priority status indicating that the participation of the user of information handling system 100-1 may be primary, or pivotal to the conference meeting. In contrast, if a user of information handling system 100-3 is not scheduled to lead a presentation during the conference meeting, focus management system 210 may associate information handling system 100-3 with a priority status below the threshold priority status indicating that the participation of the user of information handling system 100-3 may be secondary, or non-pivotal to the conference meeting.

In one embodiment, the priority status associated with each information handling system may be determined by focus management system 210 on a per conference meeting basis. For example, if the user of information handling system 100-1 shown in FIG. 2 is scheduled to announce plans for a new project during a morning conference meeting, the priority status associated with information handling system 100-1 during the morning conference meeting may be above the threshold priority status. However, if the user of information handling system 100-1 is scheduled to observe an afternoon conference meeting as a supporting member of a large team, the priority status associated with information handling system 100-1 during the afternoon conference meeting may be below the threshold priority status. In another embodiment, the priority status may be determined by focus management system 210 based on a machine-learned model. For example, if information handling systems 100-1, 100-2, and 100-3 shown in FIG. 2 regularly conduct a biweekly conference meeting in which the user of information handling system 100-1 is typically scheduled to lead a presentation during the conference meeting, focus management system 210 may associate information handling system 100-1 with a priority status above the threshold priority status. In one embodiment, the machine-learned model may be trained using historical contextual input indicating a given user's previous participation in conference meetings (e.g., as indicated by an audio stream captured by audio sensor 186, one or more images of the given user captured by image sensor 182, and/or a proximity signal captured by proximity sensor 184). In other embodiments, the priority status for a given information handling system may be determined by the user of an information handling system participating in the conference meeting, by an administrator of computing system 200, and/or any combination of systems suitable for determining a priority status.

In one embodiment, focus management system 210 may cause a focus management event to occur during a conference meeting based on a priority status associated with a given information handling system having a user in the distracted state. In particular, focus management system 210 may determine that the user is in the distracted state based on the focus mode received from the given information handling system, identify a priority status associated with the given information handling system, and cause a focus management event to occur based on whether the identified priority status is above or below the threshold priority status. If the priority status of the given information handling system is above the threshold priority status, focus management system 210 may transmit a signal to each of the other information handling systems participating in the conference meeting indicating that the user of the given information handling system is in the distracted state. By indicating that the user of the given information handling system is in the distracted state, focus management system 210 may prevent users of the other information handling systems participating in the conference meeting from becoming distracted before, and/or during, the conference meeting by trying to communicate with the user in the distracted state. In contrast, if the priority status of the given information handling system is below the threshold priority status, focus management system 210 may refrain from transmitting the signal to each of the other information handling systems participating in the conference meeting indicating that the user is in the distracted state. By refraining from indicating that the user of the given information handling system is in the distracted state, focus management system 210 may prevent causing other participants in the conference meeting from becoming distracted in response to a distracted user whose participation in the conference meeting may be secondary, or non-pivotal to the conference meeting. In this way, focus management system 210 may cause focus management events based on priority status to ensure that each user in the focused state during a conference meeting may remain in the focused state throughout the conference meeting without becoming distracted by a user in the distracted state.

FIG. 2 provides an example use case in which focus management system 210 may cause a focus management event to occur in response to determining that priority status associated with a given information handling system is above the threshold priority status. In the example illustrated in FIG. 2, information handling systems 100-1 through 100-N may be scheduled to participate in a conference meeting in which the user of information handling system 100-1 is scheduled to lead a presentation. Each participating information handling system in computing system 200 may provide respective signals 220 to focus management system 210 such that focus management system 210 may determine a focus mode of each user of information handling systems 100. Focus management system 210 may determine that the user of information handling system 100-1 is in the distracted state based on signal 220-1. In addition, focus management system 210 may determine that the priority status associated with information handling system 100-1 is above the threshold priority status given that the user of information handling system 100-1 is scheduled to lead the presentation. In response to determining that the priority status associated with information handling system 100-1 is above the threshold priority status, focus management system 210 may transmit signals 230-2 through 230-N to each of the other information handling system 100-2 through 100-N indicating that the user of information handling system 100-1 is in the distracted state. In one embodiment, signals 230 may additionally indicate that the conference meeting will be postponed until the user of information handling system 100-1 has returned to the focused state (i.e., as indicated by signal 220-1) such that the user may lead the presentation. In addition, focus management system 210 may transmit signal 230-1 to information handling system 100-1 indicating that the distracted state of the user may cause the conference meeting to be postponed.

In one embodiment, focus management system 210 may cause a focus management event to occur during a conference meeting based on a connection quality associated with a given information handling system. Each information handling system 100-1 through 100-N of computing system 200 may be associated with a connection quality used to communicatively couple the information handling system to focus management system 210. For example, each information handling system 100-1 through 100-N may exhibit a different quality of bandwidth, audio/video resolution, and/or bitrate during a conference meeting. Focus management system 210 may identify the respective connection quality associated with each information handling system 100-1 through 100-N during the conference meeting (e.g., via a sideband network channel) and cause a focus management event to occur in response to the connection quality for a given information handling system becoming compromised (e.g., experiencing bandwidth and/or packet loss issues).

In one embodiment, the focus management event caused by focus management system 210 may include remotely communicating with a given information handling system experiencing a compromised connection quality. In particular, focus management system 210 may transmit a signal to the given information handling system indicating that the connection quality of the given information handling system has become compromised. For example, if the audio stream of the given information handling system includes ambient noise such as static, other such interference, focus management system 210 may transmit a signal to the given information handling system notifying the user that the connection quality is experiencing bandwidth and/or packet loss issues during the conference meeting. In another embodiment, focus management system 210 may cause the audio stream of the given information handling system experiencing ambient noise to be in a muted state. For example, in response to identifying ambient noise included in the audio stream of the given information handling system, focus management system 210 may remotely access the audio sensor 186 of the given information handling system and cause the audio sensor 186 to be in the muted state. This may prevent the audio stream of the given information handling system from causing the users of the other information handling systems participating in the conference meeting from becoming distracted by the ambient noise and entering the distracted state. In another embodiment, focus management system 210 may additionally include one or more suggestions for resolving the compromised connection quality in the signal transmitted to the given information handling system. For example, focus management system 210 may recommend that the user of the given information handling system use an alternate information handling system during the conference meeting, switch to a different network, and/or attempt to reconnect to the conference meeting. In one embodiment, if the compromised connection quality cannot be resolved, focus management system 210 may cause the audio stream of the given information handling system experiencing ambient noise to become muted as described above. By causing a focus management event to occur in response to identifying a compromised connection quality, focus management system 210 may avoid constantly monitoring, or polling, each information handling system participating in a conference meeting, thus reducing resource consumption. Additionally, the focus management events caused by focus management system 210 in response to identifying a compromised connection quality may help to ensure that each user participating in the conference meeting remains in the focused state without becoming distracted by one or more users experiencing a compromised connection quality.

FIG. 3 is a flowchart depicting selected elements of an embodiment of a method for managing information handling systems. It is noted that certain operations described in method 300 may be optional or may be rearranged in different embodiments.

Method 300 may begin at step 310, where focus management system 210 may receive a signal from each of a plurality of information handling systems 100 indicating a focus mode of a user. Each of the information handling systems 100 may have a focus engine 190 configured to determine the focus mode of the user based on contextual input. For example, each information handling system may include a focus engine 190 as illustrated in FIG. 1 to determine the focus mode of the user based on contextual input captured by sensor devices 180. The focus mode of the user indicates whether the user is in a focused state or in a distracted state. In step 320, focus management system 210 may determine that the user of a given information handling system is in the distracted state. For example, a user may be in a distracted state while having a personal conversation with a coworker, receiving a notification from a social media network, and/or answering a person email. In response to determining that the user of the given information handling system is in the distracted state, focus management system 210 may identify a priority status associated with the given information handling system at step 330. For example, the priority status associated with a given information handling system may be based on whether a user is scheduled to lead a presentation, is expected to be a primary participant, and/or is directly related to the subject matter to be discussed during the conference meeting. In step 340, focus management system 210 may cause a focus management event to occur based on the identified priority status. For example, focus management system 210 may transmit a signals 230-2 through 230-N to information handling systems 100-2 through 100-N, respectively, indicating that the user of information handling system 100-1 is in the distracted state as shown in FIG. 2. This focus management event may cause each user of the other information handling systems participating in the conference meeting to remain in the focused state.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a plurality of information handling systems, the method comprising:
  receiving, by a focus management system, a signal from each of the plurality of information handling systems indicating a focus mode of a user, each of the plurality of information handling systems associated with a priority status and including a focus engine configured to determine the focus mode of the user based on contextual input, the focus mode indicating whether the user is in a focused state or in a distracted state;
  determining, by the focus management system based on the focus mode, that the user of a given information handling system of the plurality of information handling systems is in the distracted state; and
  in response to determining that the user of the given information handling system is in the distracted state:
    identifying the priority status associated with the given information handling system, the priority status indicating a priority in which the user of the given information handling system is to remain in the focused state; and
    causing a focus management event to occur based on the identified priority status, the focus management event causing each user of the plurality of information handling systems to be in the focused state.

2. The method of claim 1, wherein causing the focus management event to occur based on the identified priority status comprises:
  determining, by the focus management system, that the priority status associated with the given information handling system is above a threshold priority status; and
  in response to determining that the priority status is above the threshold priority status:
    transmitting a signal to each of the plurality of information handling systems indicating that the user of the given information handling system is in the distracted state.

3. The method of claim 1, wherein causing the focus management event to occur based on the identified priority status comprises:
  determining, by the focus management system, that the priority status associated with the given information handling system is below a threshold priority status; and
  in response to determining that the priority status is below the threshold priority status:
    refraining from transmitting a signal to each of the plurality of information handling systems indicating that the user of the given information handling system is in the distracted state.

4. The method of claim 1, wherein causing the focus management event to occur based on the identified priority status comprises:
  causing, by the focus management system, an audio sensor of the given information handling system to be in a muted state, the muted state of the audio sensor preventing each user of the plurality of information handling systems from hearing the user of the given information handling system.

5. The method of claim 1, wherein identifying the priority status associated with the given information handling system is based on a machine learned model.

6. The method of claim 1, wherein determining the focus mode of the user based on the contextual input comprises:
  accessing, by the focus engine of each of the plurality of information handling systems, one or more images of the user captured by an image sensor of the information handling system;
  determining, by the focus engine, that a gaze of the user is not directed toward the information handling system; and
  causing, by the focus engine, the focus mode of the user to indicate that the user is in the distracted state.

7. The method of claim 6, further comprising:
  determining, by the focus engine, that the gaze of the user is directed toward the information handling system; and
  causing, by the focus engine, the focus mode of the user to indicate that the user is in the focused state.

8. The method of claim 1, wherein determining the focus mode of the user based on the contextual input comprises:
  accessing, by the focus engine of each of the plurality of information handling systems, an audio stream captured by an audio sensor of the information handling system;
  determining, by the focus engine, that the audio stream includes an ambient noise causing the user to be in the distracted state; and
  causing, by the focus engine, the focus mode of the user to indicate that the user is in the distracted state.

9. The method of claim 8, further comprising:
  determining, by the focus engine, that the audio stream does not include the ambient noise causing the user to be in the distracted state; and
  causing, by the focus engine, the focus mode of the user to indicate that the user is in the focused state.

10. The method of claim 1, wherein determining the focus mode of the user based on the contextual input comprises:
  accessing, by the focus engine of each of the plurality of information handling systems, a proximity signal captured by a proximity sensor of the information handling system;
  determining, by the focus engine, whether the user is within a threshold proximity to the information handling system based on the proximity signal; and
  in response to determining that the user is not within the threshold proximity to the information handling system, causing, by the focus engine, the focus mode of the user to indicate that the user is in the distracted state.

11. A computing system for managing a plurality of information handling systems, the computing system comprising:
  a plurality of information handling systems, each information handling system associated with a priority status and including a focus engine configured to determine a focus mode of a user based on contextual input, the focus mode indicating whether the user is in a focused state or in a distracted state; and
  a focus management system configured to:
    receive a signal from each of the plurality of information handling systems indicating the focus mode of the user;
    determine, based on the focus mode, that the user of a given information handling system of the plurality of information handling systems is in the distracted state; and in response to determining that the user of the given information handling system is in the distracted state:
   identify the priority status associated with the given information handling system, the priority status indicating a priority in which the user of the given information handling system is to remain in the focused state; and
   cause a focus management event to occur based on the identified priority status, the focus management event causing each user of the plurality of information handling systems to be in the focused state.

12. The computing system of claim 11, wherein to cause the focus management event to occur based on the identified priority status, the focus management system is further configured to:
   determine that the priority status associated with the given information handling system is above a threshold priority status; and
   in response to determining that the priority status is above the threshold priority status:
      transmit a signal to each of the plurality of information handling systems indicating that the user of the given information handling system is in the distracted state.

13. The computing system of claim 11, wherein to cause the focus management event to occur based on the identified priority status, the focus management system is further configured to:
   determine, by the focus management system, that the priority status associated with the given information handling system is below a threshold priority status; and
   in response to determining that the priority status is below the threshold priority status:
      refrain from transmitting a signal to each of the plurality of information handling systems indicating that the user of the given information handling system is in the distracted state.

14. The computing system of claim 11, wherein to cause the focus management event to occur based on the identified priority status, the focus management system is further configured to:
   cause an audio sensor of the given information handling system to be in a muted state, the muted state of the audio sensor preventing each user of the plurality of information handling systems from hearing the user of the given information handling system.

15. The computing system of claim 11, wherein the focus management system is configured to identify the priority status associated with the given information handling system based on a machine learned model.

16. The computing system of claim 11, wherein to determine the focus mode of the user based on the contextual input, the focus engine of each of the plurality of information handling systems is further configured to:
   access one or more images of the user captured by an image sensor of the information handling system;
   determine that a gaze of the user is not directed toward the information handling system; and
   cause the focus mode of the user to indicate that the user is in the distracted state.

17. The computing system of claim 16, wherein the focus engine is further configured to:
   determine that the gaze of the user is directed toward the information handling system; and
   cause the focus mode of the user to indicate that the user is in the focused state.

18. The computing system of claim 11, wherein to determine the focus mode of the user based on the contextual input, the focus engine of each of the plurality of information handling systems is further configured to:
   access an audio stream captured by an audio sensor of the information handling system;
   determine that the audio stream includes an ambient noise causing the user to be in the distracted state; and
   cause the focus mode of the user to indicate that the user is in the distracted state.

19. The computing system of claim 18, wherein the focus engine is further configured to:
   determine that the audio stream does not include the ambient noise causing the user to be in the distracted state; and
   cause the focus mode of the user to indicate that the user is in the focused state.

20. The computing system of claim 11, wherein to determine the focus mode of the user based on the contextual input, the focus engine of each of the plurality of information handling systems is further configured to:
   access a proximity signal captured by a proximity sensor of the information handling system;
   determine whether the user is within a threshold proximity to the information handling system based on the proximity signal; and
   in response to determining that the user is not within the threshold proximity to the information handling system, cause the focus mode of the user to indicate that the user is in the distracted state.

* * * * *